W. DIETER.
OILER FOR AUTOMOBILE TORPEDOES.
APPLICATION FILED FEB. 7, 1919.

1,319,993.	Patented Oct. 28, 1919.

WITNESS:
René Bruine

INVENTOR:
William Dieter,
By Attorneys,
Fraser, Dark & Myers

UNITED STATES PATENT OFFICE.

WILLIAM DIETER, OF BROOKLYN, NEW YORK, ASSIGNOR TO E. W. BLISS COMPANY, OF BROOKLYN, NEW YORK, A CORPORATION OF WEST VIRGINIA.

OILER FOR AUTOMOBILE TORPEDOES.

1,319,993.     Specification of Letters Patent.     Patented Oct. 28, 1919.

Application filed February 7, 1919. Serial No. 275,541.

*To all whom it may concern:*

Be it known that I, WILLIAM DIETER, a citizen of the United States of America, residing in the borough of Brooklyn, city and State of New York, have invented certain new and useful Improvements in Oilers for Automobile Torpedoes, of which the following is a specification.

This invention relates to the lubrication of automobile torpedoes. It is applicable, for example, to the lubricating system set forth in the patent to Frank M. Leavitt, No. 1,150,777, granted August 17, 1915. This patent sets forth a lubricating system whereby a force pump is driven from the propelling mechanism and forces oil through ducts to the several bearing surfaces that require special lubrication. The oil is drawn from a reservoir so mounted within the torpedo that it may be replenished from the exterior.

It sometimes happens that the important bearing surfaces of the propelling mechanism of a torpedo are not adequately lubricated prior to launching. The forced feed lubricating system does not begin to operate until, upon the launching of the torpedo, the propelling mechanism is set in operation; and there then ensues a brief interval during which the oil is being pumped from the reservoir to the bearings, and before it reaches the latter in adequate volume to insure correct lubrication. Consequently, it sometimes results that the propelling mechanism begins to operate with bearings which are insufficiently lubricated, the consequences of which are detrimental. The present invention is designed to provide means whereby an adequate supply of lubricant may be introduced into all the bearings just prior to the launching of the torpedo.

The preferred embodiment of the invention is shown in the accompanying drawings, wherein it is assumed that the lubricating means of the said Leavitt patent is used.

Figure 1:
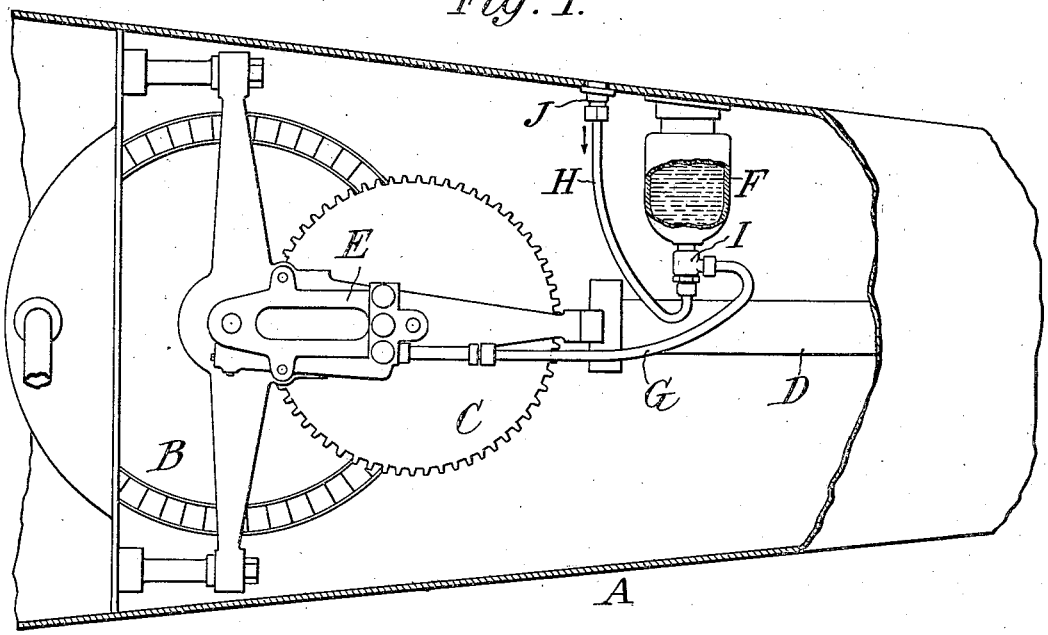
Figure 1 is a fragmentary sectional elevation of the stern portion or afterbody of the torpedo.

Referring to Fig. 1, A is the hull of the torpedo, B is its propelling turbine, C is a gear of the train of gearing, D is the exterior of the two propeller shafts, and E is the oil pump, all of these parts being as shown in Fig. 1 of said patent. F is the oil reservoir, and G is a tube or duct for conducting oil therefrom to the inlet of the pump. The construction of the pump is not shown, being immaterial to the present invention. It suffices to say that the pump is driven from the propelling mechanism and draws in the oil from the tube G and expels it to passages or ducts leading to the respective bearings, suitable inlet and outlet valves being provided for each plunger of the pump, all of which may be constructed as set forth in said patent.

J is a connection or socket fastend to the hull of the torpedo in any convenient position, and from it leads a tube H to the casing of a valve I. This valve is shown in detail in Figs. 2 and 3. It is applied in any suitable location, preferably at the outlet from the oil reservoir F. In the construction shown, it has an inlet nipple or coupling $a$ for connection with the end of the tube H; an outlet branch $b$ for connection with the tube G, and a passage $c$ communicating with the bottom of the reservoir. The valve proper is shown as a ball valve $d$, which normally rests upon a lower seat formed by the upper end of the nipple $a$. In this position the oil may flow from the reservoir through passage $c$, and out through the passage in branch $b$ and through tube G to the pump.

Figure 3:
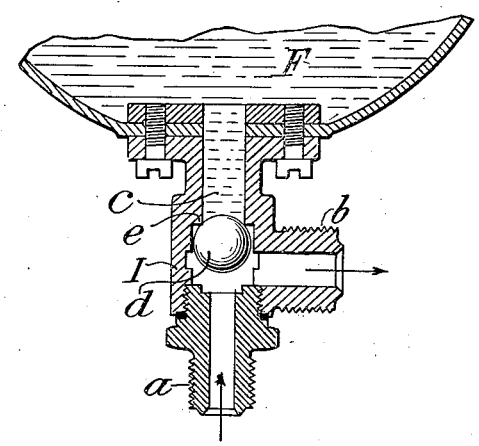
Fig. 3 is a similar section showing the valve lifted in the oil-priming position.

In order to prime the bearings with oil prior to launching, any suitable means is provided for introducing oil to the connection J, as, for example, by means of a hose leading from an outside oil reservoir or pump, or it may be by a simple syringe containing oil. The connection may be made by screwing the oil supply outlet to the socket J. Thereupon, by putting the oil under pressure, it is forcibly introduced through the tube H and lifts the valve $d$, so that the latter seats itself against an upper seat $e$, as shown in Fig. 3, so that the oil thus introduced is prevented from flowing up into the oil reservoir and is compelled to flow out through the tube G to the oil pump, and thence, by freely lifting the valves of the pump, to flow therefrom through the several ducts or passages leading to the respective bearings.

Figure 2:
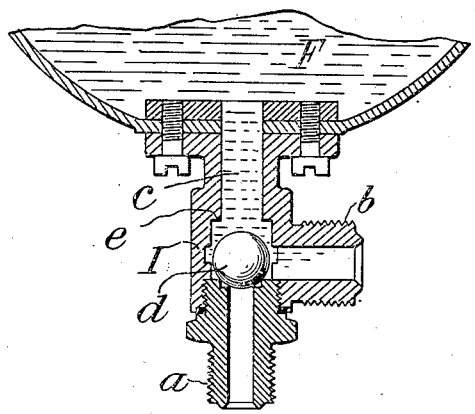
Fig. 2 is a vertical section on a larger scale, of a valve beneath the oil reservoir.

Thus, the present invention provides means whereby just prior to launching the torpedo, the effective lubrication of its principal bearings may be insured. All that is necessary is to bring a suitable source of oil under pressure, such as a syringe, into communication with the tube H, as by screwing its outlet into the socket J and then forcing oil therefrom through tubes H and G, and through the pump and connecting passages to the bearings. A syringe or pump of the requisite capacity may be used and emptied at a single stroke, whereupon it may be unscrewed, and the socket J may be plugged or not. Upon the conclusion of this oil-priming operation, the valve $d$ drops back to its original position, as shown in Fig. 2, and upon the launching of the torpedo and the starting of its oil pump, the normal oiling operation at once takes place without any interference therewith by the valve.

The construction may be variously modified and rearranged without departing from the invention, as set forth in the claims.

I claim as my invention:—

1. In a torpedo having propelling apparatus and a forced feed lubricator therefor, the combination therewith of means for conducting oil from the exterior of the torpedo to the bearings for priming them prior to launching.

2. In a torpedo having propelling apparatus, the combination therewith of a priming socket opening through the shell of the torpedo, and an oil duct leading therefrom to the bearings of said propelling apparatus whereby said bearings may be primed prior to launching by the forced introduction of oil through said socket.

3. In a torpedo having propelling apparatus, the combination with an oil reservoir and lubricating pump adapted in normal running to lubricate the bearings of the propelling apparatus, of a priming socket and a duct leading therefrom to said pump adapted upon the forced introduction of oil through said socket to prime said bearings prior to launching.

4. In a torpedo, the combination with an oil reservoir and lubricating pump, of a priming socket, a valve, a tube leading from said socket to said valve, a tube leading from said valve to said pump, and a passage from the reservoir to said valve, the latter adapted normally to close communication with said socket, and upon the forced introduction of oil through said socket to close communication with the reservoir.

In witness whereof, I have hereunto signed my name.

WILLIAM DIETER.